United States Patent [19]
Mooney et al.

[11] 3,934,701
[45] Jan. 27, 1976

[54] LINEAR INDEXING MACHINE

[75] Inventors: John Russell Mooney; Troy Richard Radford, both of Fort Worth, Tex.

[73] Assignee: Mooney Engineering, Inc., Fort Worth, Tex.

[22] Filed: Mar. 28, 1975

[21] Appl. No.: 563,197

[52] U.S. Cl. .................. 198/19; 198/85; 104/167; 104/172 BT
[51] Int. Cl.² ......................................... B23Q 07/16
[58] Field of Search ............ 198/19, 76, 85, 38, 34; 104/167, 172 R, 172 B, 172 BT

[56] References Cited
UNITED STATES PATENTS

| | | | |
|---|---|---|---|
| 1,263,043 | 4/1918 | Curtis, Jr. ..................... | 104/172 BT |
| 2,752,883 | 7/1956 | Curtis ............................. | 198/34 X |
| 2,893,535 | 7/1959 | Kay ................................ | 104/172 R |
| 3,175,516 | 3/1965 | Bernard ......................... | 104/172 BT |
| 3,666,076 | 5/1972 | Miller et al. ..................... | 198/19 X |
| 3,805,942 | 4/1974 | Auernhammer ................. | 198/19 |

FOREIGN PATENTS OR APPLICATIONS

| | | | |
|---|---|---|---|
| 849,151 | 9/1960 | United Kingdom .................. | 198/34 |
| 1,259,779 | 1/1968 | Germany .............................. | 198/85 |

*Primary Examiner*—Evon C. Blunk
*Assistant Examiner*—Richard K. Thomson
*Attorney, Agent, or Firm*—Wm. T. Wofford

[57] ABSTRACT

A linear indexing machine comprising a continuously driven conveyor for conveying a plurality of pallets to and from a plurality of index stations to allow work functions to be performed on work pieces carried by the pallets. At each station, the pallets are detached from the conveyor while at conveyor speed; decelerated; stopped for a predetermined time interval to allow a work function to be performed on their work pieces; accelerated to conveyor speeds; and then attached to the conveyor for conveyance to the next station. An index cam follower is carried by each pallet and an index cam, driven in synchronism with the conveyor, is disposed at each station for co-acting with the cam followers of the pallets to decelerate, stop, and accelerate the pallets.

6 Claims, 12 Drawing Figures

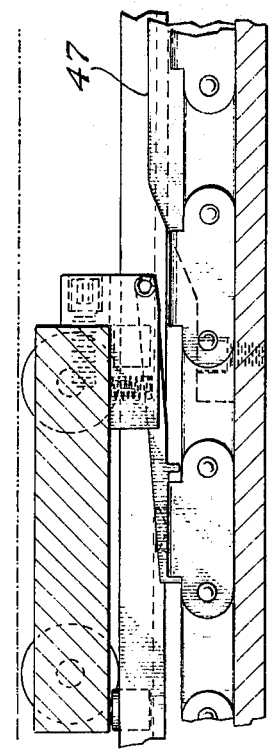
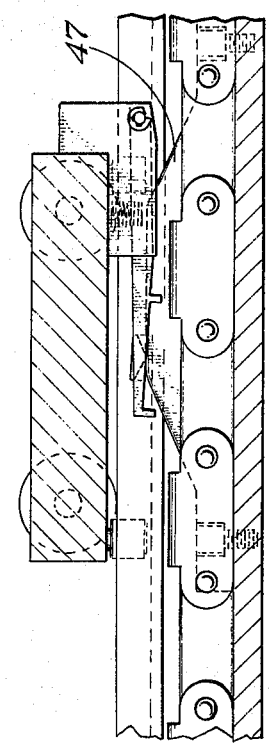
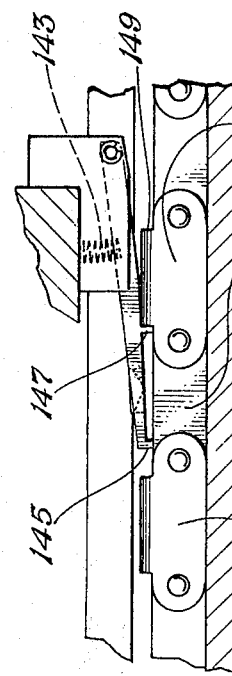
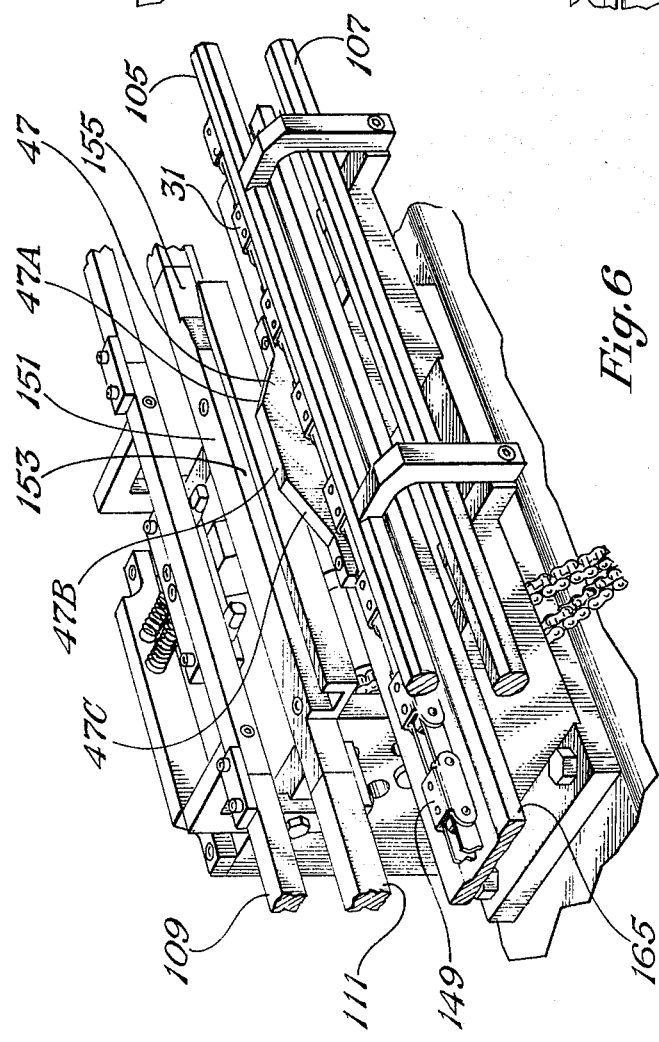

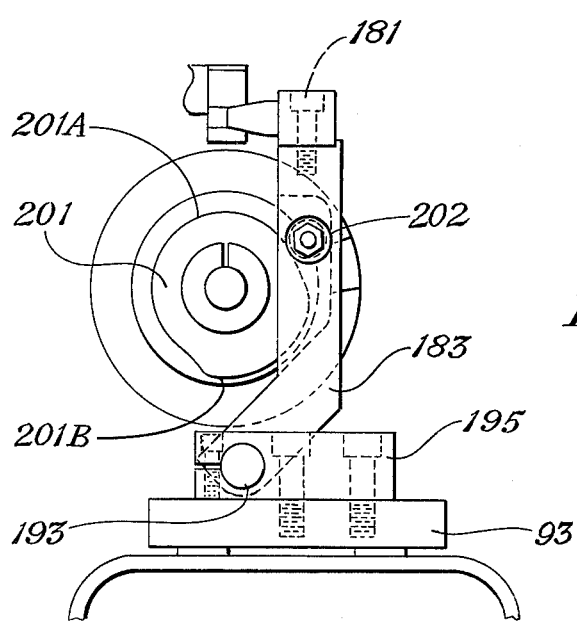
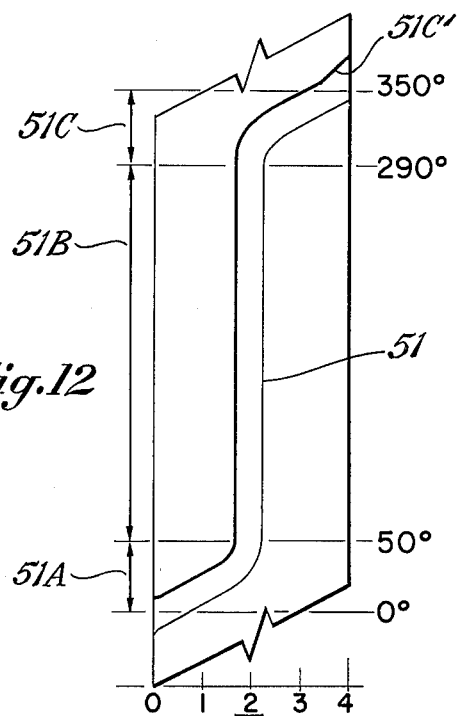
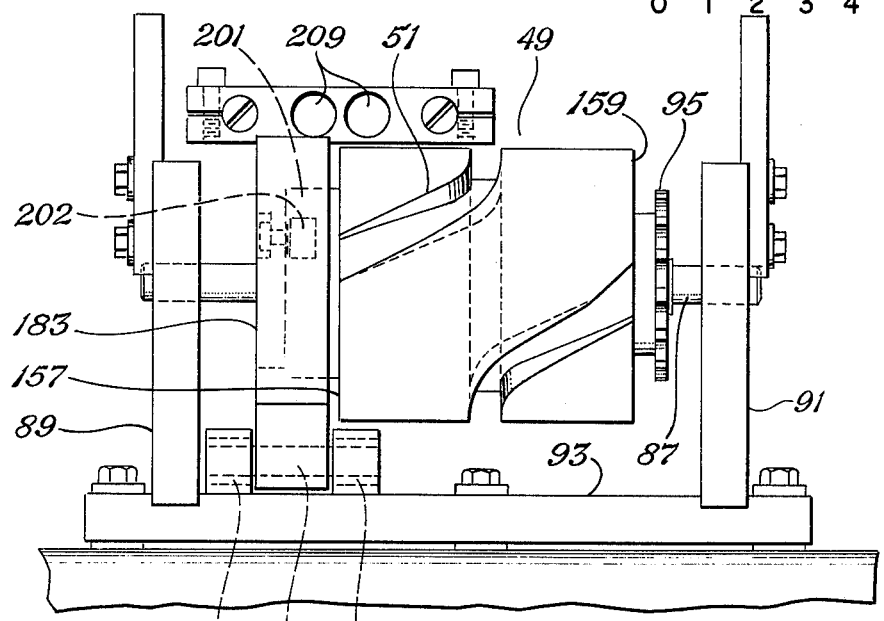

LINEAR INDEXING MACHINE

BACKGROUND OF THE INVENTION

This invention relates to a pallet-type, multi-station indexing machine and more particularly to such a machine wherein the pallets are conveyed by a continuously driven endless conveyor to the stations, detached from the conveyor for a predetermined time interval to allow work functions to be performed on work pieces carried by the pallets, and then attached to the conveyor for conveyance to the next station.

In the conventional pallet-type, multi-station indexing machine, a plurality of pallets are fixedly attached to an endless chain or flexible metallic belt which is indexed or intermittently driven a predetermined index distance to sequentially convey the pallets to each work station to allow work functions to be performed on the work pieces carried by the pallets. Although such machines are in use in the industry, they have disadvantages. For example, all of the pallets must be started and stopped at the same time which results in inertia problems. In addition, any inaccuracy in pallet location is cummulative since the accuracy of location of a pallet along the chassis or frame is determined by the cummulative error in the links of the chain or the links of the metallic belt from the drive sprocket to the location of the pallet. In the case of the pallet near the end of the machine where the idler sprocket is located, the error may be considerable. Moreover, a force exerted in any station tending to displace a pallet is transmitted to the chain or the belt and has a tendency to displace all of the pallets. Furthermore, the conventional machines require the work stations to be located at one of the points where the pallets come to rest and in addition, require indexing between stations or a large number of pallets, which increases the cost of the machine.

Indexing machines have been proposed wherein a continuously driven endless conveyor is employed for conveying the pallets which are detached from the conveyor at each station to allow a work function to be performed on its work piece and then attached to the conveyor for conveyance to the next station. The proposed machines of this type known to the inventor, however, have not proved to be satisfactory.

SUMMARY OF THE INVENTION

It is an object of the present invention to provide an effective and unique pallet-type multi-station indexing machine wherein the pallets are conveyed by a continuously driven endless conveyor to the stations, detached from the conveyor, decelerated to a stop position for a predetermined time interval to allow work functions to be performed on the work pieces carried by the pallets, and then accelerated and attached to the conveyor for conveyance to the next station.

It is a further object of the present invention to provide such a machine which includes an indexing cam at each station driven in synchronism with the conveyor for coacting with a cam follower on each of the pallets for decelerating the pallets to a stop postion after they have been detached from the conveyor at conveyor speed, holding the pallets for a predetermined time interval, and thereafter accelerating the pallets to conveyor speed for attachment to the conveyor.

In a further aspect, the linear indexing machine comprises a plurality of pallets each of which is adapted for carrying a work piece; conveyor means for conveying said pallets to and from a plurality of index stations; an index cam follower carried by each said pallet; an index cam disposed at each index station and having a cam surface means for co-action with said index cam followers; and means for driving said index cams in synchronism with said conveyor means. In addition, there is provided means for detaching said pallets from said conveyor means as said pallets approach each index station, with said index cam surface means co-acting with said cam followers to decelerate said pallets to stop at said index stations, to hold said pallets at said index stations for a predetermined time interval, and to thereafter accelerate said pallets to conveyor speeds, and means for thereafter attaching said pallets to said conveyor means.

In the embodiment disclosed, said conveyor means comprises an endless conveyor means supported for movement along a linear path of a predetermined distance with the index stations being located at spaced positions along said linear path. Each index cam comprises a cylindrical member supported for rotation at its associated station near said conveyor means and located such that its axis of rotation is parallel to the path of travel of said conveyor means at its associated station. The cam surface means comprises a slot formed in the cylindrical surface of the cylindrical member for receiving the cam followers carried by each pallet. Each slot extends continuously from one end of the cylindrical member to the other and comprises, in serial order, a helical entry portion, a deceleration portion, a dwell portion which extends a predetermined number of degrees around the cylindrical member in a plane perpendicular to the axis of the cylindrical member, an accleration portion, and a helical exit portion having the same pitch as that of the helical entry portion.

BRIEF DESCRIPTION OF THE DRAWINGS

FIG. 5 is a perspective view of the bottom of one of the pallets used in the indexing machine of the present invention;

FIG. 6 is a view of one of the stations illustrating a pallet guide channel and a latch cam for detaching a pallet from the conveyor chain and for allowing the pallet to be attached to the chain as it leaves the station;

FIG. 7 illustrates the chain latch of one of the pallets shown latched or connected to the conveyor chain;

FIG. 8 illustrates the chain latch of the pallet of FIG. 7, raised by the chain latch cam to a detaching position;

FIG. 9 illustrates the pallet latch attached to the conveyor chain after the pallet has passed the chain latch cam and, hence, the index station;

FIG. 10 is a side-view of one of the index cams an which also shows a shot pin and its lever employed at the station for holding a pallet after its cam follower reaches the dwell position of the index cam;

FIG. 11 is an end-view of a portion of FIG. 10, illustrating the end of the index cam, the shot pin and its associated lever, and a shot pin cam formed on the end of the index cam of FIG. 10; and FIG. 12 is a view of the cam track, or slot, of the index cam of FIG. 10, shown in unfolded form.

DETAILED DESCRIPTION OF THE INVENTION

Figure 1:
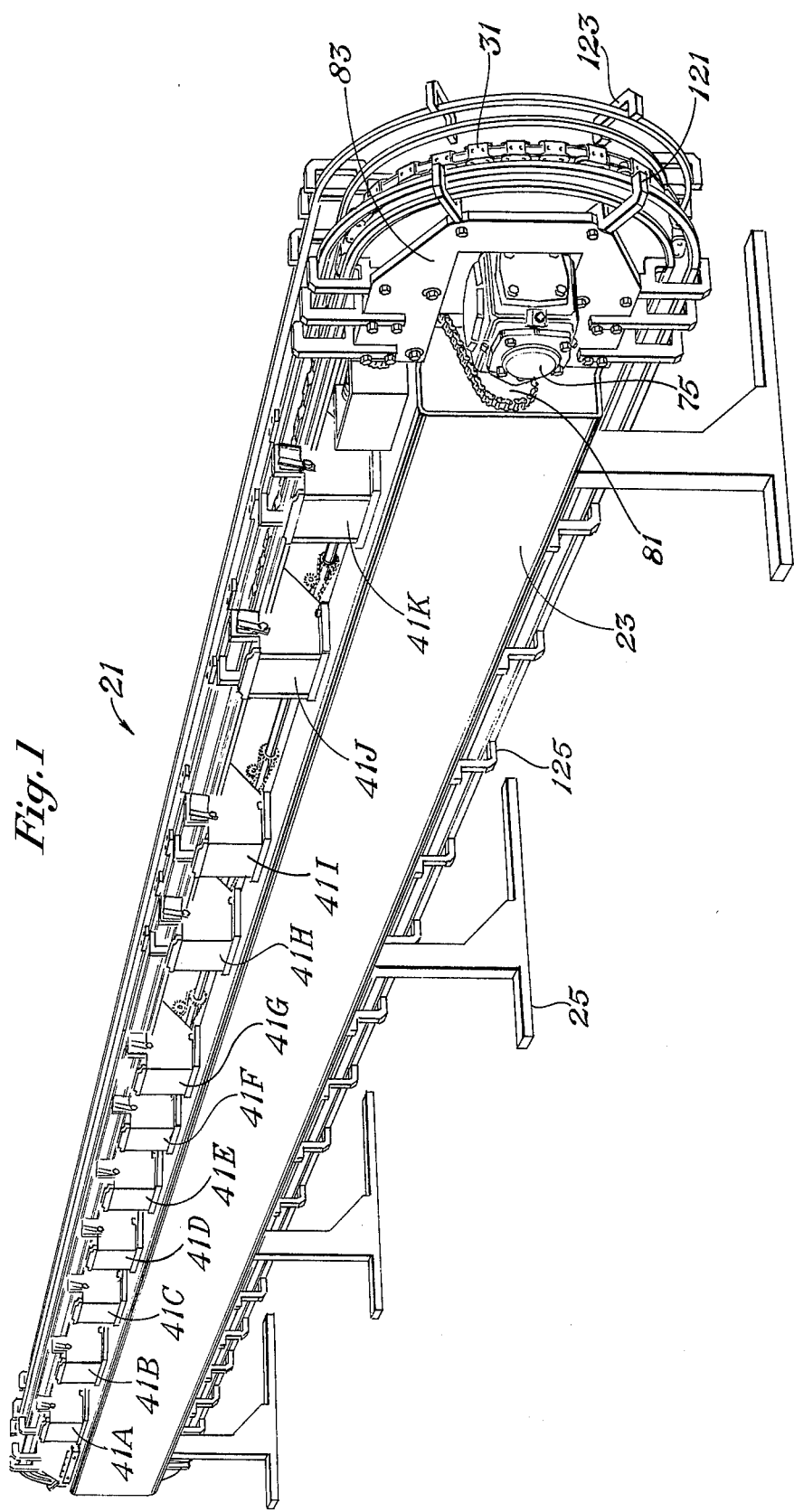
FIG. 1 is a perspective side-view of the linear indexing machine of the present invention.
Figure 2:
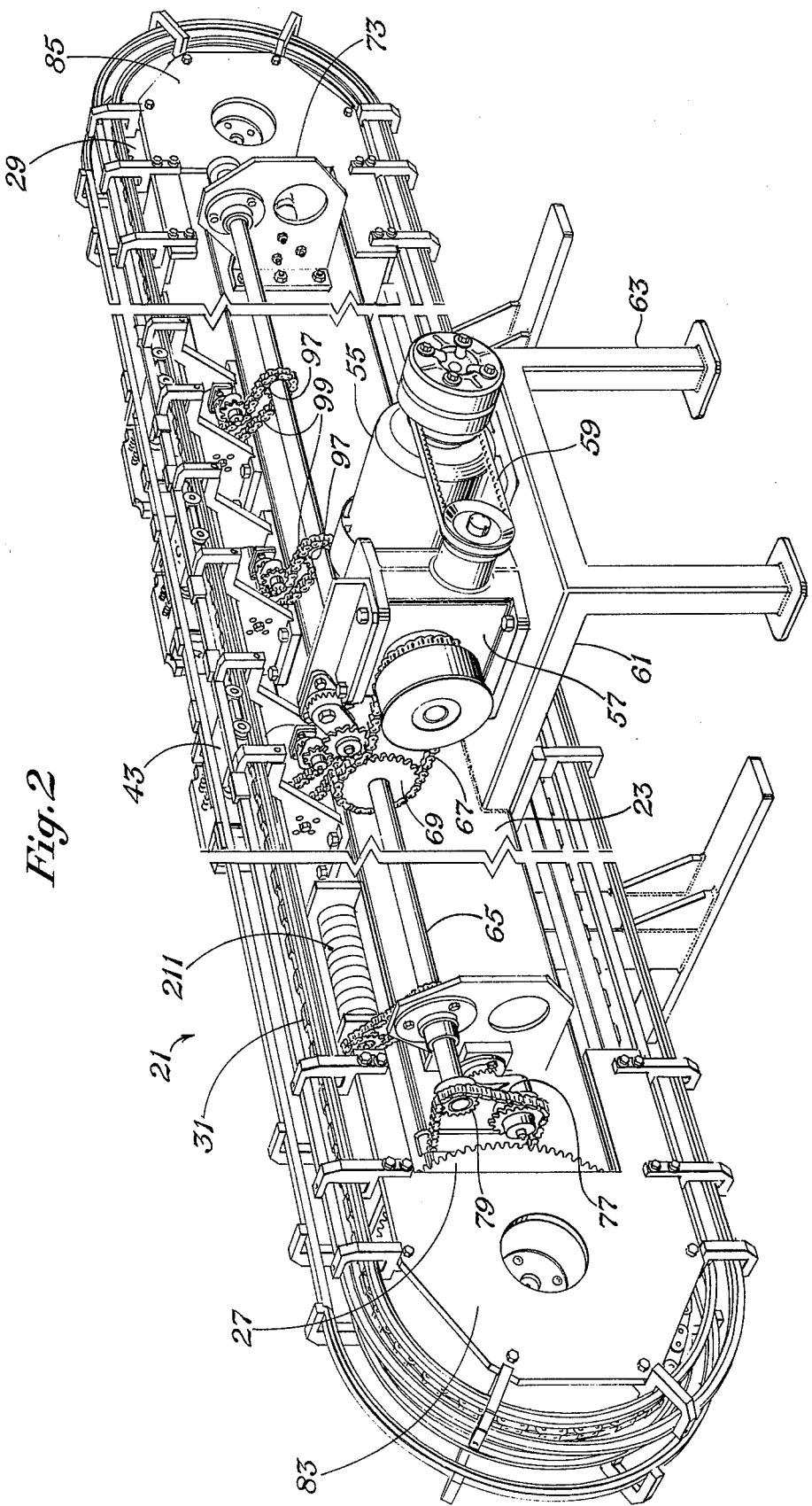
FIG. 2 is a perspective view of the other side of the machine of FIG. 1, with the machine being shown in broken form.

Referring now to FIGS. 1 and 2, the linear indexing machine of the present invention is identified at 21. It is an over and under type and comprises an elongated frame or chassis 23, supported by legs 25. Rotatably supported at opposite ends of the frame are a drive sprocket 27 and an idler sprocket 29, around which is continually driven an endless conveyor chain 31. Supported at the top of the frame 23 at spaced apart positions along the linear path of travel of the conveyor chain 31, are a plurality of work stations 41A – 41K. A plurality of pallets or carriages 43 are detachably secured to the conveyor chain 31 for carrying work pieces for sequential conveyance to each of the stations to allow different types of work operations or functions automatically to be performed on the work pieces.

Figure 3:
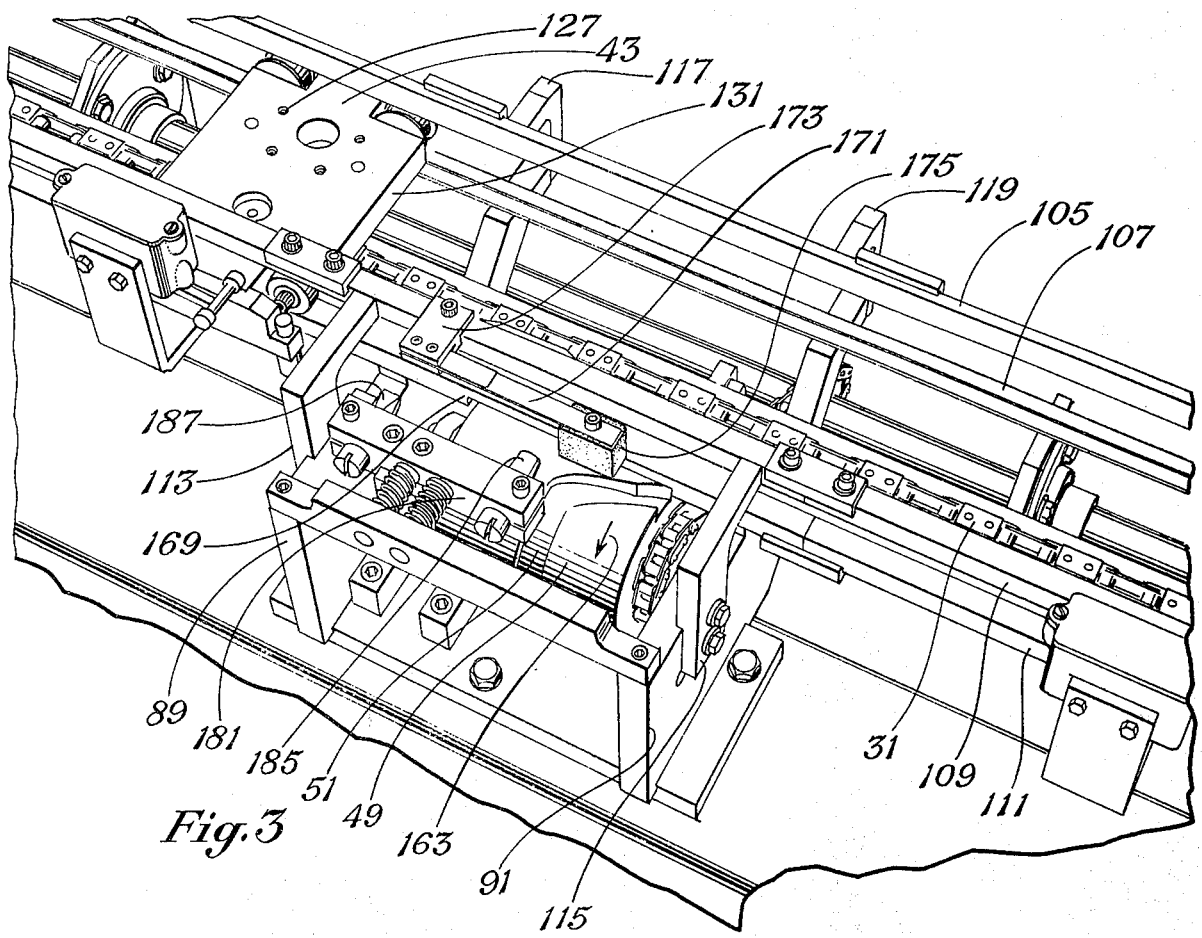
FIG. 3 is a view of one of the stations of the indexing machine of the present invention, showing an indexing cam with a pallet approaching the cam and the station.
Figure 4:
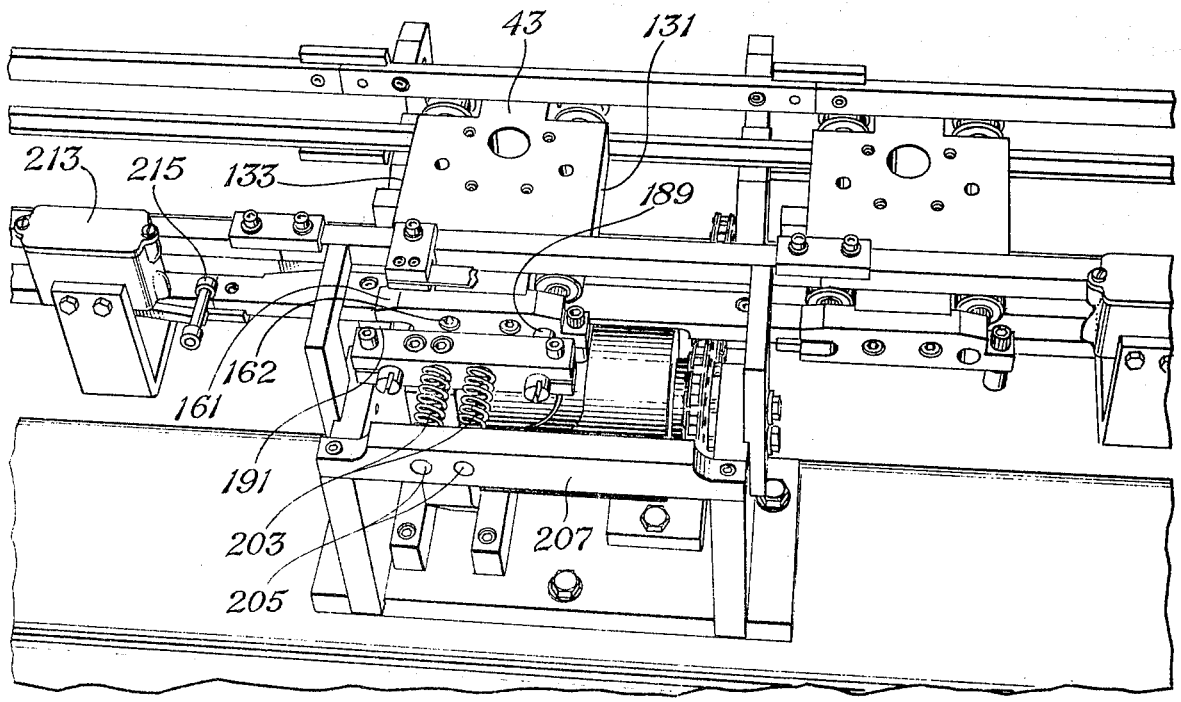
FIG. 4 is a view of the station and index cam of FIG. 3, with a pallet in the work station and with its cam follower in the cam track, or slot, of the index cam.

The pallets are illustrated in more detail in FIGS. 3, 4 and 5. Each pallet has a latch 45 supported at its bottom side for detachably securing the pallet to the conveyor chain. Located at each station is a pallet detaching device or cam 47, illustrated in FIGS. 6, 8 and 9 and a rotating cylindrical index cam 49, illustrated in FIGS. 3, 4, 10 and 11. All of the index cams 49 are driven in synchronism with the drive sprocket 27 and hence, with the linear speed of travel of the conveyor chain 31. Each of the devices 47 detaches a pallet from the conveyor chain at conveyor speed as the pallet approaches its station and the index cam 49 decelerates and stops and holds the pallet at its station for a predetermined time interval to allow a work function to be performed on the work piece carried by the pallet. At the termination of the holding period, the index cam 49 accelerates the pallet to conveyor speed at which time, the device 47 allows the pallet to be attached to the conveyor chain for conveyance to the next station. The index cam 49 has a slot or track 51 for co-acting with a cam follower 53 carried by the pallet to perform the pallet deceleration, holding, and acceleration function. The index cam slot 51 is illustrated in detail in FIGS. 10 and 11.

The machinery and equipment at the work stations for performing the work functions on the work pieces carried by the pallets are not illustrated for purposes of clarity. Neither is their drive system. The system for driving the drive sprocket 27 and hence the conveyor chain 31 and the index cams 49 comprise a drive motor 55 which drives a speed reducer 57 by way of a belt 59. As illustrated, the motor 55 and speed reducer 57 are supported on a table 61 having one end connected to the frame 23 and its other end supported by legs 63. The speed reducer 57 drives an elongated shaft 65 by way of a chain 67 and sprocket 69, the latter of which is connected to the shaft 65. The shaft 65 is supported for rotation by plates such as 71 and 73 connected to the frame 23. At the drive sprocket end of the frame 23, the shaft 65 drives a miter gear box 75 which in turn drives or rotates the drive sprocket 27 for moving the conveyor chain 31. The miter gear box 75 is driven by way of a drive chain 77 coupled around a sprocket 79 connected to the end of the shaft 65 and a sprocket 81 connected to the gear box 75. The drive and idler sprockets 27 and 29 are supported for rotation by a bearing assembly supported by plates 83 and 85 connected to the frame 23.

The shaft 65 also drives each of the cylindrical index cams 49 in synchronism with the linear speed of the conveyor chain 31. As illustrated in FIGS. 3, 4 and 10, each index cam 49 is rotatably supported by a shaft 87 which in turn is supported by plates 89 and 91 secured to a base 93 which in turn is secured to the top of the frame 23 at each station near and to one side of the conveyor chain 31. Each index cam 49 is located near and to one side of the conveyor chain 31 with its axis of rotation parallel to the linear path of travel of the conveyor chain 31 at its station. Secured to one end of each of the index cams 49 around its shaft 87 is a sprocket 95. A sprocket 97 (see FIG. 2) is connected to the shaft 65 in line with each of the cam sprockets 95 and a drive chain 99 is coupled around the cam sprocket and the associated sprocket of the shaft 65. Thus, when the shaft 65 is rotated, it drives the drive sprocket 27 and hence the conveyor chain 31 and at the same time drives all of the index cams 49, by way of their chains 99 and sprockets 95, in synchronism with the rotation of the drive sprocket 27 and hence, in synchronism with the linear speed of travel of the conveyor chain 31.

As illustrated in FIG. 5, each of the pallets 43 has a pair of spool shaped guide wheels 101 rotatably secured on one side and a pair of plain cylindrical wheels 103 rotatably secured on its other side. These wheels rotate on and between two pairs of rails 105, 107 and 109, 111, supported on opposite sides of the conveyor chain 31 for supporting the pallets as they are driven by the conveyor chain and while at the work stations. As seen in FIGS. 3 and 4, rails 105, 109 and 111 are rectangular or square in cross-section while rail 107 is octagonal in cross-section, although it could be hexagonal in cross-section. Wheels 101 rotate on the octagonal rail 107 which provides contact across the cylindrical portion of the wheels and on the sloping sides of their rims to maintain the wheels 101 and hence the pallet 43 in alignment between the indexing or work stations. The top rail 105 maintains contact with the cylindrical portion of the wheels 101 to prevent them from raising. Both of rails 109 and 111 maintain contact with the cylindrical surfaces of the wheels 103. In FIG. 6, the rail 105, above rail 107, is shown octagonal in cross-section, however, it is to be understood that it may be rectangular in cross-section as shown in FIGS. 3 and 4.

The rails 105, 107 and 109, 111 extend in a linear path from one end of the frame 23 to the other at the top where the work stations are located; curve around the end of the frame; continue along the bottom; and then curve around the other end of the frame to form two pairs of continuous rails for supporting and guiding the pallets over and under the frame as the pallets are conveyed from the beginning work station to the last work station at the top of the frame, around the end and under the frame and then around the other end, back to the beginning work station. At the top of the frame 23, rail 109 is supported by members 113 and 115 connected to plates 89 and 91 while rail 105 is supported by members 117 and 119 connected to plates 89 and 91. Both of rails 107 and 111 are supported directly by the plates 89 and 91. At the ends of the frame, the rails 105, 107 and 109, 111 are supported by members 121 and 123 connected to the frame structure 83 and 85. At the bottom of the frame, the rails are supported by members 125 connected to the frame 23.

The pallets 43 have threaded apertures 127 formed in their top sides for mounting work pieces to the pallets. Thus, the pallets, in effect, are chucks for holding the work pieces which are mounted above the pallets for conveyance to the different stations located on the top side of the frame 23. As illustrated in FIGS. 1, 3 and 4, the pallets move from left to right. At the first work station 41A, as seen in FIG. 1, the work pieces are mounted to the pallets and removed from the pallets at the last work station 41K. Work functions are performed on the work pieces at the intermediate stations 41B – 41J. In addition, work functions may be performed on the work pieces at the first and last stations 41A and 41K.

In FIGS. 3 – 5, the forward end of a pallet is identified at 131 and the rear end is identified at 133. The conveyor chain latch 45 and the index cam follower 53 are coupled to the bottom side of the pallet, as well as two pallet guide cam followers 135, the latter of which are employed to accurately align and guide the pallet while at a work station. The conveyor chain latch 45 has its rear end pivotally connected in a slot 137 of an L-shaped member 139 which in turn is connected to the bottom, rear end of the pallet 43. The pivotal connection between the latch 45 and the member 139 is by way of a pivot pin 141. The latch 45 can pivot downward and upward in the slot 137 relative to its pivot point 141. This is illustrated in FIGS. 7 – 9. A compression spring 143 is located in the slot 137 of member 139 and is supported in an aperture (not shown) formed in the bottom side of the pallet for normally biasing the free end of the latch 45 downward as illustrated in FIGS. 5, 7 and 9. The bottom end of the spring is not connected to the latch 45 but engages its top side.

Extending downward from the bottom end of the latch 45 are two spaced tabs or dogs 145 and 147 for attaching the latch 45 and hence the pallet 43 to the conveyor chain. As illustrated in FIGS. 7 – 9, the conveyor chain comprises links 31A and 31B with rectangular shaped attachments 149 (see also FIG. 6) secured to the top of alternate links 31A. The dogs 145 and 147 are spaced apart sufficient to straddle an attachment 149, as illustrated in FIG. 9 or to be located between adjacent attachments, as illustrated in FIG. 7 when the free end of the latch 45 is biased downward by the spring 143. In either position, the latch 45 and hence the pallet 43 is attached to the conveyor chain 31 such that the pallet 43 will move with the conveyor chain with its wheels supported and guided by the rails. When a pallet is on the underside of the frame 23 and is upside down, the spring 143 will bias the free end of the latch 45 upward to maintain it latched to the conveyor chain.

As illustrated in FIG. 6, a pallet guide member 151 having a guide channel 153 extends from the conveyor chain side of the rectangular bottom rail 111 at each station for receiving the pallet guide cam followers 135 to accurately align and guide the pallets at each work station. In FIG. 6, the direction of travel of the chain is from right to left. At the entry end of the station, the channel 153 is flared at 155 to facilitate proper entry of the pallet guide cam followers 135. Each of the cam followers 53 and 135 comprise cylindrical bearings which rotate around a rod attached to the bottom of the pallet. The pallet guide channels are located only at the work stations for accurate alignment of the pallets at the stations. Between the work station, where accurate alignment of the pallets is not required, at the curved corners and at the bottom of the machine, the pallets are guided by their two spool shaped wheels as described above. With this arrangement, there is avoided the necessity of continuing the guide channels the full length of the machine, around the corners and at the bottom, which also reduces wear of the cam followers 135.

As a pallet approaches a station and after its guiding cam followers 135 enter the guide channel 153 for proper alignment, its index cam follower 53 enters the index cam track or slot 51, formed in the cylindrical surface of the index cam. As shown in FIG. 10, the index cam slot 51 extends continuously from the leading edge 157 of the index cam 49 to its trailing edge 159. The leading edge is defined as the edge which the pallet first approaches and the trailing edge is defined as the edge which the pallet leaves last, after leaving a station. Referring to FIG. 12, the slot 51 comprises an entry portion 51A, a dwell portion 51B, and an exit portion 51C. In FIG. 12, the vertical axis represents degrees while the horizontal axis represents the axial length of the index cam which in one embodiment is 4 inches. The entry portion may be divided into a constant velocity entry portion and a deceleration portion while the exit portion may be divided into an acceleration portion and a constant velocity exit portion. In FIG. 12, on the horizontal axis, the constant velocity entry portion extends between 0 and 1; the deceleration portion extends between 1 and 2; the acceleration portion extends between 2 and 3; and the constant velocity exit portion extends between 3 and 4.

The index cam follower 53 extends from the front bottom end of a bar 161 connected to the side of the pallet 43 at a position such that it is located outward of the wheels 103. Connection is by way of hex bolts, illustrated at 162, in FIG. 4 whereby the bar 161 is in effect a part of the pallet 43 and travels with the pallet. When the pallet is on the rails, its index cam follower 53 is located on the outside of rails 109 and 111 and extends below the top surface of bottom rail 111. The index cam 49 also is located on the outward side of rails 109 and 111 at a level and at a position such that the cam follower 53 can enter the entry portion of the slot 51 as the index cam 49 rotates. In FIG. 3, the direction of rotation of the index cam 49 is illustrated by the arrow 163. As shown in FIG. 10, the top of the index cam 49 will turn toward the reader while the bottom will turn away from the reader. The index cams 49 are driven in synchronism with the conveyor chain 31, as indicated above, such that when the cam follower 53 of a pallet 43 approaches the leading edge of an index cam, the entry portion of the slot 51 will be at a position to allow the cam follower to enter the slot.

The entry portion of the index cam slot 51 between 0 and 1, as seen in FIG. 12, is helical in form. Since the index cam 49 is turning at a constant rpm, the cam follower 53, when in the helical entry portion, will be displaced linearly from left to right, as seen in FIGS. 10 and 12, at a constant linear velocity. The pitch of the helix is such that the cam follower and hence the pallet will move linearly from left to right (as seen in FIGS. 10 and 12) in the helical entry portion at the same linear velocity as the conveyor chain 31. Hence, when the cam follower is in the helical entry portion of the index cam slot 51, the pallet is moving at the same linear velocity as the conveyor chain. During the travel of the cam follower in the helical entry portion of the index cam slot, the pallet latch 45 is lifted off of the conveyor chain whereby the pallet is detached from the conveyor chain while traveling at the same linear speed as the conveyor chain. This will be described subsequently.

As shown in FIG. 12, the deceleration portion of the slot between 1 and 2 is not helical but progresses from helical form to circular form. Thus, when the cam follower is in the deceleration portion, after the pallet has been detached from the conveyor chain, the linear velocity of the cam follower and hence of the pallet from left to right as seen in FIGS. 3, 4, 10 and 12 is decelerated. The dwell portion of the index cam slot extends around the circumference of the index cam in a plane perpendicular to its axis for a certain number of degrees. When the cam follower is in this portion of the slot, there is no linear displacement of the cam follower and hence of the pallet. It is during this period that a work function is performed on a work piece carried by the pallet. A shot pin assembly is provided for holding the pallet in a stable position during this time interval to allow the work function to be effectively performed on the work piece.

As seen in FIG. 12, the acceleration portion of the slot between 2 and 3 progresses from circular form to helical form. Thus, when the cam follower is in this portion of the slot, the linear speed of the cam follower and hence of the pallet, from left to right, as seen in FIG. 12, is accelerated toward conveyor speed. The constant velocity exit portion of the slot between 4 and 3 also is helical with the same pitch as that of the helical entry portion. Thus, when the cam follower is in the helical exit portion of the slot, the linear speed of the cam follower and hence of the pallet is equal to that of the conveyor chain. During the travel of the cam follower in this portion of the slot, the pallet latch 45 and hence the pallet 43 is attached to the conveyor chain.

In one embodiment, the entry portion 51A of the index cam slot extends angularly around the cam about 50°; the dwell portion 51B extends angularly around the cam for about 240° and the exit portion 51C extends angularly around the cam about 60°. The width of the entry portion of the slot is wider than the cam follower by about 0.075 of an inch which permits a slight error in the timing of the conveyor chain and the index cam without causing binding between the cam follower and the cam slot. In addition, the exit portion flares outward at 51C' on one edge to an exit funnel shaped to relieve any binding that may occur in the event of an error in timing between the index cam and conveyor chain.

Referring again to FIGS. 5 and 6, there will be described the mechanism for detaching a pallet from the conveyor chain when its cam follower is in the helical entry portion of the index cam slot and for attaching the pallet to the conveyor chain when its cam follower is in the helical exit portion of the index cam slot. This mechanism comprises the cam member 47 which is secured to a base 165 at each station to one side of the conveyor chain 31 between the longitudinal ends of the pallets guide member 151. The cam member 47 has a ramped shaped leading edge 47A, a flat top edge 47B and a ramped shaped trailing edge 47C. These edges form a camming surface which coacts with the bottom of a cam follower 167 formed on one side of the latch 45 about midway between the dogs 145 and 147. As shown in FIG. 5, the bottom of the cam follower 167 is trough shaped with a flat center portion 167B and leading and trailing edges 167A and 167C, respectively.

Referring to FIGS. 7 – 9, the manner in which the cam member 47 and cam follower 167 coact to detach and attach the pallet from and to the conveyor chain will be described. In FIGS. 7 – 9, the path of travel of the conveyor chain and hence of the pallet is from right to left. In FIG. 7, the dogs 145 and 147 of the latch 45 are shown latched between the attachments 149 of alternate chain links 31A. In this figure, the pallet is approaching a work station (not shown). As the pallet approaches the cam member 47, the leading slanting edge 167A of the cam follower 167 will ride up the leading ramped shaped edge 47A of member 47 to raise and detach the latch and hence the pallet from the conveyor chain. This occurs during the time that the cam follower 53 is in the helical entry portion of the index cam slot 51. As the index cam follower moves from the deceleration portion of the slot to the dwell portion and then to the acceleration portion, the flat bottom portion 167B of the cam follower 167 rides on the upper flat surface 47B of the cam member 47 to maintain the latched dogs above and out of contact with the conveyor chain to maintain the pallet detached from the conveyor chain during this period. As the index cam follower enters the helical exit portion of the index cam slot, the trailing slanting edge 167C of the cam follower 167 rides down the trailing ramped edge 47C of the cam member 47 to allow the latch and hence the pallet to become attached to the conveyor chain again.

Although the dogs 145 and 147 of the latch 45 are shown in FIGS. 7 – 9 as being initially attached between the attachments 149 of alternate chain links 31A and then attached to the chain 31 by straddling the attachment 149 of one of the chain links 31A, it is to be understood that the dogs of a given latch will always drop down for attachment to the conveyor chain in the same manner in order to maintain the proper position and hence timing. For example, if the dogs 145 and 147 are to straddle an attachment 149, they will do so each time they are reattached to the conveyor chain at each station following detachment.

Referring again to FIG. 3, there is illustrated a friction brake 169 for applying a retarding force to the pallets to insure that they are latched in the proper position to the conveyor chain when leaving the index cam. The index cam is so dimensioned that a pallet is moved by the exit portion of the index cam slot to a position slightly ahead of the proper position on the conveyor chain. During the terminal part of the exit portion of the index cam slot, where the funnel portion 51C' is located, a retarding force is applied to the pallet by the friction brake 169 to retard its movement so that its latch will drop at the droper position on the conveyor chain. The friction brake, illustrated, comprises a spring arm 171 having one end connected to rail 109 by a connector 173 and a friction pad member 175 connected to the under side of the other end of the spring arm for engaging a pallet when it reaches the sponge rubber member 175 for applying the retarding force.

As indicated above, a shot pin assembly is employed for holding the pallet in a steady stable position at each station during the dwell period to allow the work functions to be performed on the work pieces. Referring to FIGS. 3, 4, 10 and 11, the shot piece assembly comprises a bar 181 moveably supported by a lever 183 and having a round pin 185 and a diamond pin 187 adapted to fit into an aperature 189 and a slot 191 respectively formed in the outward facing side of the pallet bar 161. Shortly after the pallet enters the dwell period, the bar 181 moves toward the pallet to insert its pins 185 and 187 into the hole and slot 189 and 191, respectively, to prevent the pallet from moving. Shortly before the end of the dwell period, the bar 181 is moved away from the pallet to pull its pins out of the pallet to allow the pallet to move. The shot pin bar 181 is held in the retracted position until the next pallet is in the station.

As shown in FIGS. 10 and 11, the shot pin lever 183 is located in front of the leading end of the index cam 49. Its lower end is pivotally coupled to the base 93 by way of a pivot pin 193 supported in members 195 which are secured to the top of the base 93. The bar 181 is connected to the free end of the lever 183. With this arrangement, the free end of the lever and hence the bar 181 may be moved to the left, as shown in FIG. 11, to a holding position to insert its pins in the pallet, and to the right to a retracted position to remove its pins from the pallet. The lever is moved to its holding and retracting positions by a cam 201 attached to the leading end of index cam 49. As seen in FIG. 11, the cam 201 comprises a circular holding surface 201A and a circular retracting surface 201B. The radius of curvature of surface 201B is greater than that of 201A. Normally, the bar 181 is biased toward the rails 109 and 111 (toward the left, as seen in FIG. 11) by two compression springs 203 supported in aperatures 205 formed in support bar 207. The other ends of the springs 203 are supported in aperatures 209 formed in the back side of the shot pin bar 181. Attached to the lever 183 is a cam follower 202 which is adapted to engage the cam surfaces 201A and 201B. As the shot pin cam 201 is rotated clockwise, as seen in FIG. 11, the holding surface 201A of cam 201 is turned for engagement with the cam follower 202 to allow the springs 203 to bias the bar 181 to the left to insert its pins into the pallet. As the cam 201 continues to rotate clockwise, the retracting surface 201B is presented for engagement with the cam follower 202. Since this surface has a larger radius, the lever 183 and hence the bar 181 is moved to the right to pull the shot pins 185 and 187 out of the pallet.

In order to insure that the pallets arrive at the work stations at the proper time, a safety timing system is provided. This system comprises timing cams 211 (see FIG. 2) driven in synchronism with the shaft 65 and a limit switch 213 having a lever 215 tripped by the pallet bars 161 as they approach the station. A pair of timing cams are provided for each station, each of which controls a separate timing switch associated with the stations. Each limit switch normally is closed and each timing switch is closed during certain time intervals defined as "Safe" or "Gate" times and is opened at other time intervals. If a given limit switch is opened by a pallet during any time other than the "Safe" or "Gate" time of its associated timing switch, the conveyor chain 31 is stopped. Thus, if a pallet arrives at the limit switch 213 location either too early or too late, the limit switch will be opened at a time not within the gate time of the timing switch which will result in the circuit being interrupted to stop the conveyor chain.

In one embodiment, the indexing machine of the present invention has 21 work stations, although only 11 stations are shown, and 49 pallets. Since the pallets are not fixedly attached to the conveyor, it may be driven continuously and the work stations may be located at staggered positions so that no two pallets are accelerated or decelerated at the same time thereby eliminating the inertia problem present in the prior art devices. Moreover, the problem of accuracy of the pallet location on the conveyor, due to cummulative error, does not exist with the present system. Accuracy is determined by the station location which is independent of the conveyor system. In addition, since the location of the stations are not tied to specific intervals as required by the prior art, the location of the stations may be tailored to the particular work station requirements. Further, the present system permits a low ratio of pallet indexing time to dwell time, thus, contributing significantly toward maximum production for the machine.

Although the present machine was disclosed as having a conveyor chain and as being of the over and under type, it is to be understood that the principles of the present invention may be employed on machines having an endless belt rather than an endless conveyor chain and which are of the around the corner type rather than the over and under type.

What is claimed is:
1. A linear indexing machine comprising:
    a. a plurality of pallets each of which is adapted for carrying a work piece;
    b. conveyor means for conveying said pallets to and from a plurality of index stations;
    c. an index cam follower carried by each said pallet;
    d. an index cam disposed at each index station;
    e. means for driving said index cams in synchronism with said conveyor means;
    f. each said index cam having a cam surface means for coaction with said index cam follower;
    g. means for detaching a said pallet from said conveyor means as said pallet approaches each index station, with said index cam surface means coacting with said cam follower to decelerate said pallet to stop at said index station, to hold said pallet at said index station for a predetermined time interval and to thereafter accelerate said pallet to conveyor speed, and means for thereafter attaching said pallet to said conveyor means.
2. A linear indexing machine comprising:
    a. a plurality of pallets each of which is adapted for carrying a work piece;
    b. conveyor means for conveying said pallets to and from a plurality of index stations;
    c. an index cam follower carried by each said pallet;
    d. an index cam disposed at each index station;
    e. means for driving said index cams in synchronism with said conveyor means;
    f. each said index cam having a cam surface means for coaction with said index cam follower, said cam surface means having in serial order from the entry end an entry portion, a deceleration portion, a dwell portion, an acceleration portion, and an exit portion;
    g. means for detaching a said pallet from said conveyor means while said cam follower is coacting with the entry portion of said cam surface means and attaching the said pallet to said conveyor means while said cam follower is coacting with the exit portion of said cam surface means.
3. The machine of claim 1 wherein:
    said conveyor means comprises an endless conveyor means supported for movement along a linear path of a predetermined distance,
said work stations being located at spaced positions along said linear path,
each index cam comprises
- a cylindrical member supported for rotation at its associated station near said conveyor means and located such that its axis of rotation is parallel to the path of travel of said conveyor means at its associated station,
- said cam surface means extends continuously from one end of said cylindrical member to the other and comprises in serial order a deceleration portion, a dwell portion which extends a predetermined number of degrees around said cylindrical member in a plane perpendicular to the axis of said cylindrical member, and an acceleration portion,
- said means for driving said index cams in synchronism with said conveyor means comprises:
- means for rotating said cylindrical members in synchronism with the velocity of travel and position of said conveyor means along said linear path.

4. The indexing machine of claim 3 wherein said cam surface means comprises:
- an initial constant velocity portion serially ahead of said deceleration portion and which is helical in form, and
- a trailing constant velocity portion serially behind said acceleration portion and which is helical in form.

5. The indexing machine of claim 1 wherein:
said conveyor means comprises an endless conveyor means supported for movement along a linear path of a predetermined distance,
said index stations being located at spaced positions along said linear path,
each index cam comprises
- a cylindrical member supported for rotation at its associated station near said conveyor means and located such that its axis of rotation is parallel to the path of travel of said conveyor means at its associated station,
- said cam surface means comprises a slot formed in the cylindrical surface of said cylindrical member for receiving said cam followers carried by each pallet,
- said slot extends continuously from one end of said cylindrical member to the other and comprises a helical entry portion, a deceleration portion, a dwell portion which extends a predetermined number of degrees around said cylindrical member in a plane perpendicular to the axis of said cylindrical member, an acceleration portion, and a helical exit portion having the same pitch as that of said helical entry portion,
- said means for driving said index cams in synchronism with said conveyor means comprises means for rotating said cylindrical members in synchronism with the velocity of travel of said conveyor means along said linear path.

6. The indexing machine of claim 5 wherein said means for detaching and attaching said pallets from and to said conveyor means, detaches said pallets when their cam followers are in said helical entry portions of said slots of said cylindrical members and attaches said pallets to said conveyor means when their cam followers are in said helical exit portions of said slots of said cylindrical members.

* * * * *